United States Patent Office 2,819,267
Patented Jan. 7, 1958

2,819,267

NEW DERIVATIVES OF DICARBOXYLIC ACID HYDRAZIDES AND THEIR USE IN THE COMBATTING OF FUNGI

Alfred Margot and Hans Gysin, Basel, Switzerland, assignors to J. R. Geigy A.-G., Basel, Switzerland, a Swiss firm No Drawing. Application May 27, 1955
Serial No. 511,790

Claims priority, application Switzerland June 1, 1954

5 Claims. (Cl. 260—250)

The present invention is concerned with new derivatives of dicarboxylic acid hydrazides, the production thereof as well as their use for the control of fungi. The surprising observation has now been made that new compounds having an excellent fungicidal action are obtained if one mol of trichloromethane sulphenyl chloride (perchloromethyl mercaptan) is reacted in the presence of an acid binding agent with one mol of a dicarboxylic acid hydrazide of the general formula:

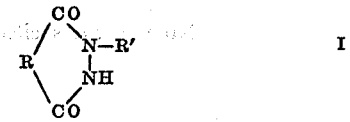

wherein R represents a vicinal divalent hydrocarbon radical and R' represents hydrogen or a monovalent hydrocarbon radical, there being, at the most, one aromatic ring in the entire molecule; or if one mol of trichloromethane sulphenyl chloride is reacted with an alkali salt of a dicarboxylic acid hydrazide according to the above definition.

The compounds so obtained correspond to the general formula:

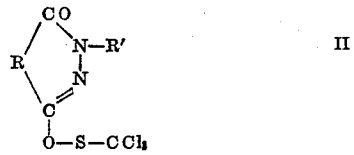

wherein R and R' have the meanings given above. Most of them are solid crystalline substances but sometimes they are of a honey-like consistency.

The reaction can be performed for example by dissolving a dicarboxylic acid hydrazide of the general Formula I in diluted alkali lye and then pouring in or adding dropwise the trichloromethane sulphenyl chloride at 10–20°. The use of previously formed alkali salts dispersed in inert organic solvents as well as the reaction of the free hydrazides in acid binding organic solvents such as, for example, pyridine, or in inert organic solvents in the presence of acid binding agents such as, e. g. sodium or potassium carbonate, triethylamine or tributylamine, has generally no advantages over this simple process.

Examples of starting products of the general Formula I are the hydrazides, monomethyl hydrazides, monoethyl hydrazides, mono-isopropyl hydrazides, monocyclohexyl hydrazides, monophenyl hydrazides, monobenzyl hydrazides of succinic acid, maleic acid, tetrahydrophthalic acid and phthalic acid. Thus, for example, R can represent the ethylene, vinylene (ethenylene), cyclohexenylene or o-phenylene radical and R' can represent hydrogen or the methyl, ethyl, isopropyl, cyclohexyl, phenyl or benzyl radical.

The following examples serve to illustrate further the production of the new compounds. Parts are given as parts by weight and their relationship to parts by volume is as that of grammes to cubic centimetres. The temperatures are given in degrees centigrade.

Example 1

19 parts of N-phenyl succinic acid hydrazide are dissolved in 100 parts by volume of N-caustic soda lye and 19 parts of perchloromethyl mercaptan are slowly added at about 10° while stirring and cooling. The whole is stirred for some hours at room temperature, the reaction of the mixture is made just phenolphthalein alkaline by the addition of caustic soda lye and the precipitate is drawn off by suction. It is washed first with water and then with a little methanol. The N-phenyl-trichloromethane sulphenyl succinic acid hydrazide so obtained can be further purified by recrystallisation for example from chloroform cyclohexane. It then melts at 188–189°.

N-ethyl-trichloromethane sulphenyl phthalic acid hydrazide is obtained in an analogous manner. Recrystallised from cyclohexane it melts at 105–106°. Trichloromethane sulphenyl maleic acid hydrazide decomposes at 205°.

Example 2

19 parts of perchloromethyl mercaptan are added dropwise at 10–15° while stirring well to a mixture of 17.6 parts of N-methyl phthalic acid hydrazide, 100 parts by volume of N-caustic soda lye and 100 parts by volume of chloroform. After stirring for several hours at room temperature, some precipitated particles of the starting product are removed by filtration under suction and the layers of the filtrate are separated. The organic phase is washed with diluted caustic soda lye and water until the reaction is neutral and the solvent is distilled off. On adding cyclohexane to the oily residue, the N-methyl-trichloromethane sulphenyl phthalic acid hydrazide crystallises out. It can be further purified by recrystallisation from methanol and it then melts at 128–129°.

In repeated trials the residue of a solution of 250γ of N-phenyl-trichloromethane sulphenyl succinic acid hydrazide or of N-ethyl-trichloromethane sulphenyl phthalic acid hydrazide in 0.25 ccm. of acetone, which solution had been equally distributed on a slide of about 19 sq. cm. surface area, was sufficient in a damp atmosphere to hinder the germination of at least 9/10 of the spores laid thereon of the following fungi: *Alternaria tenuis, Aspergillus versicolor, Botrytis cinerea, Coniothyrium diplodiella, Fusarium culmorum, Penicillium crustaceum, Phoma lignicola* and *Phialophora fastigiata*. In some cases the same effect was obtained with a ten-times smaller concentration of 25γ substance in 0.25 ccm. of acetone.

The new trichloromethane sulphenyl derivatives of dicarboxylic acid hydrazides can be used as such or combined with suitable carriers and distributing agents as well as, if desired, further fungicidal or insecticidal substances for the protection of plants and parts thereof from attack by injurious fungi. They are also suitable, however, for the treatment of organic materials such as e. g. wood, textiles, furs and leather.

For example, the active ingredients can be combined with solid pulverulent carriers such as e. g. talc, kaolin, bole, bentonite, chalk, ground limestone and, if desired, the dusting agents obtained can be made suspendable in water by the addition of wetting and dispersing agents. Further, the active ingredients can be dispersed in water also with the aid of suitable emulsifiers or they can be dissolved in organic solvents, e. g. chlorinated hydrocarbons such as trichlorethylene or in medium petroleum fractions, if necessary, with the addition of auxiliary solvents such as acetone or higher ketones. Also the active ingredients can be used in aerosol form and distributed in the air as smoke or steam, in particular for example in store rooms and greenhouses.

*Example 3*

2–5 parts of active ingredient, e. g. N-phenyl trichloromethane sulphenyl succinic acid hydrazide, are ground with 98–95 parts of talc. The dusting agent so obtained, can be used for example for the disinfection of bedding earth as well as for the dusting of plants or parts thereof such as bulbs and tubers.

If the amount of active ingredient is increased to 15 parts and some adhesive substance is added, then a dry seed dressing agent is obtained which has a strong fungicidal action and at the same time does not influence germination.

*Example 4*

By grinding 10 parts of active ingredients, e. g. N-ethyl trichloromethane sulphenyl phthalic acid hydrazide with 82 parts of kaolin or chalk and mixing with 8 parts of wetting and dispersing agents, e. g. 5 parts of sulphite waste liquor and 3 parts of ethylene oxide condensation products of alkyl phenols, a concentrate is obtained which, on mixing with water, produces a fungicidal spraying agent which is excellently suitable for the treatment of the parts of plants which are above the ground.

*Example 5*

20 parts of active ingredient, e. g. trichloromethane sulphenylmaleic acid hydrazide, 40 parts of xylene and 30 parts of ethylene oxide condensation products of alkyl phenols are mixed and an emulsion concentrate is obtained which can be used for the preparation of emulsions in plant protection.

A concentrate for the production of less strongly wetting emulsions is obtained by mixing 25 parts of active ingredient, 67 parts of xylene and 8 parts of ethylene oxide condensation products.

What we claim is:

1. A derivative of a dicarboxylic acid hydrazide corresponding to the formula:

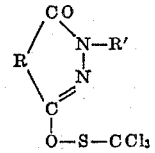

wherein R represents a member selected from the group consisting of ethylene, vinylene and o-phenylene radicals, and R' represents a member selected from the group consisting of hydrogen, lower alkyl and the phenyl radicals, the entire molecule containing at most one aromatic nucleus.

2. A derivative of a dicarboxylic acid hydrazide corresponding to the formula given in claim 1 wherein R represents an o-phenylene radical.

3. N-phenyl-trichloromethane sulphenyl succinic acid hydrazide.

4. N-ethyl-trichloromethane sulphenyl phthalic acid hydrazide.

5. Trichloromethane sulphenyl maleic acid hydrazide.

No references cited.